United States Patent
Jeannotte et al.

(10) Patent No.: US 11,268,902 B2
(45) Date of Patent: Mar. 8, 2022

(54) SYSTEMS AND METHODS FOR REFRACTIVE INDEX DETECTION

(71) Applicant: Waters Technologies Corporation, Milford, MA (US)

(72) Inventors: Anthony C. Jeannotte, Foxborough, MA (US); Mark Basile, Hollis, NH (US); Senthil Bala, Westborough, MA (US); Colin Fredette, Ashland, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 676 days.

(21) Appl. No.: 15/953,276

(22) Filed: Apr. 13, 2018

(65) Prior Publication Data
US 2018/0231461 A1    Aug. 16, 2018

Related U.S. Application Data

(62) Division of application No. 14/775,752, filed as application No. PCT/US2014/023142 on Mar. 11, 2014, now Pat. No. 9,989,459.

(Continued)

(51) Int. Cl.
*G01N 21/41*    (2006.01)
*G01N 21/05*    (2006.01)
*G01N 30/74*    (2006.01)

(52) U.S. Cl.
CPC ......... *G01N 21/4133* (2013.01); *G01N 21/05* (2013.01); *G01N 30/74* (2013.01); *G01N 2021/4146* (2013.01)

(58) Field of Classification Search
None
See application file for complete search history.

(56) References Cited

U.S. PATENT DOCUMENTS 2,427,996 A    9/1947   Seaman
2,458,508 A *  1/1949   Goetz ..................... G01N 1/14
                                                73/863.23
(Continued)

FOREIGN PATENT DOCUMENTS

GB    1267589 A     3/1972
JP    2011112530 A  6/2011
(Continued)

OTHER PUBLICATIONS

Combined Search and Examination Report in U.K. Patent Application No. GB1806588.8 dated May 15, 2018; 9 pages.
(Continued)

*Primary Examiner* — Kara E. Geisel
*Assistant Examiner* — Jarreas C Underwood
(74) *Attorney, Agent, or Firm* — Schmeiser, Olsen & Watts LLP

(57) ABSTRACT

The invention provides differential refractive index detectors and methods for the use of differential refractive index detectors. In an exemplary embodiment, a differential refractive index detector includes a flow cell body having a proximal end, a distal end, and a flow axis extending between the proximal and the distal end. The flow cell body includes a first chamber and a second chamber and the fluid conduits coupled to the flow cell body can be tapered to reduce dispersion.

16 Claims, 7 Drawing Sheets

Related U.S. Application Data

(60) Provisional application No. 61/819,811, filed on May 6, 2013, provisional application No. 61/789,098, filed on Mar. 15, 2013.

(56) References Cited

U.S. PATENT DOCUMENTS

| | | | | |
|---|---|---|---|---|
| 2,686,454 A * | 8/1954 | Walter | ............... | G01N 21/4133 356/246 |
| 2,724,304 A | 11/1955 | Crawford | | |
| 2,800,053 A * | 7/1957 | Svensson | ........... | G01N 21/4133 356/246 |
| 2,810,315 A * | 10/1957 | Miller | ................ | G01N 21/4133 356/246 |
| 2,857,803 A | 10/1958 | Reinecke et al. | | |
| 2,964,992 A * | 12/1960 | Hurdle | ............... | G01N 21/4133 356/246 |
| 3,013,465 A | 12/1961 | Collyer | | |
| 3,386,332 A * | 6/1968 | Watson | .............. | G01N 21/4133 356/130 |
| 3,612,697 A * | 10/1971 | Nebe | .................. | G01N 21/4133 356/130 |
| 3,950,104 A | 4/1976 | Munk | | |
| 3,999,856 A | 12/1976 | Unterleitner | | |
| 4,229,105 A * | 10/1980 | Silverbage | ............ | G01N 21/45 356/130 |
| 5,398,110 A * | 3/1995 | Kitaoka | ............ | G01N 21/4133 356/130 |
| 5,608,517 A | 3/1997 | Munk | | |
| 5,900,152 A | 5/1999 | Janik et al. | | |
| 6,094,262 A | 7/2000 | Almeida et al. | | |
| 6,130,439 A | 10/2000 | Le Menn | | |
| 6,295,125 B1 * | 9/2001 | Tokieda | ............. | G01N 21/4133 356/130 |
| 6,975,392 B2 | 12/2005 | Larkin | | |
| 7,283,221 B2 * | 10/2007 | Larkin | ............... | G01N 21/4133 356/130 |
| 7,320,775 B2 | 1/2008 | Kochy et al. | | |
| 7,551,270 B2 | 6/2009 | Nakamura | | |
| 7,724,356 B2 * | 5/2010 | Tokieda | ................. | G01N 21/05 356/130 |
| 7,961,318 B2 * | 6/2011 | Fischer | .................... | G01J 4/02 356/364 |
| 8,134,705 B2 | 3/2012 | Kaduchak et al. | | |
| 8,196,455 B2 | 6/2012 | Anderson et al. | | |
| 8,292,083 B2 | 10/2012 | Varghese et al. | | |
| 2002/0092340 A1 * | 7/2002 | Prater | .................. | G02B 7/1821 73/24.02 |
| 2004/0110208 A1 | 6/2004 | Chan et al. | | |
| 2007/0076192 A1 * | 4/2007 | Nakamura | ......... | G01N 21/4133 356/131 |
| 2009/0079968 A1 * | 3/2009 | Tokieda | ............. | G01N 21/0303 356/130 |
| 2009/0091757 A1 * | 4/2009 | Yang | .................. | G01N 15/1463 356/338 |
| 2009/0170149 A1 * | 7/2009 | Viator | ................ | G01N 21/1702 435/29 |

FOREIGN PATENT DOCUMENTS

| | | |
|---|---|---|
| WO | 2012148793 A1 | 11/2012 |
| WO | 2013025851 A1 | 2/2013 |

OTHER PUBLICATIONS

Examination Report in U.K. Patent Application No. GB1806588.8 dated Aug. 21, 2018; 4 pages.
International Search Report in International Patent Application No. PCT/US2014/023142, dated Jul. 30, 2014; 3 pages.
Examination Report in UK Patent Application No. GB1515755.5, dated Jul. 6, 2017; 6 pages.
Examination Report in UK Patent Application No. GB1515755.5, dated Dec. 20, 2017; 3 pages.
Examination Report in UK Patent Application No. GB1515755.5, dated Mar. 14, 2018; 3 pages.
Non-Final Office Action in U.S. Appl. No. 14/775,752, dated May 16, 2017, 16 pages.
Final Office Action in U.S. Appl. No. 14/775,752, dated Sep. 29, 2017; 22 pages.
Notice of Allowance in U.S. Appl. No. 14/775,752, dated Dec. 29, 2017; 11 pages.
Corrected Notice of Allowance in U.S. Appl. No. 14/775,752, dated Feb. 6, 2018; 2 pages.

* cited by examiner

FIG. 3A  FIG. 3C

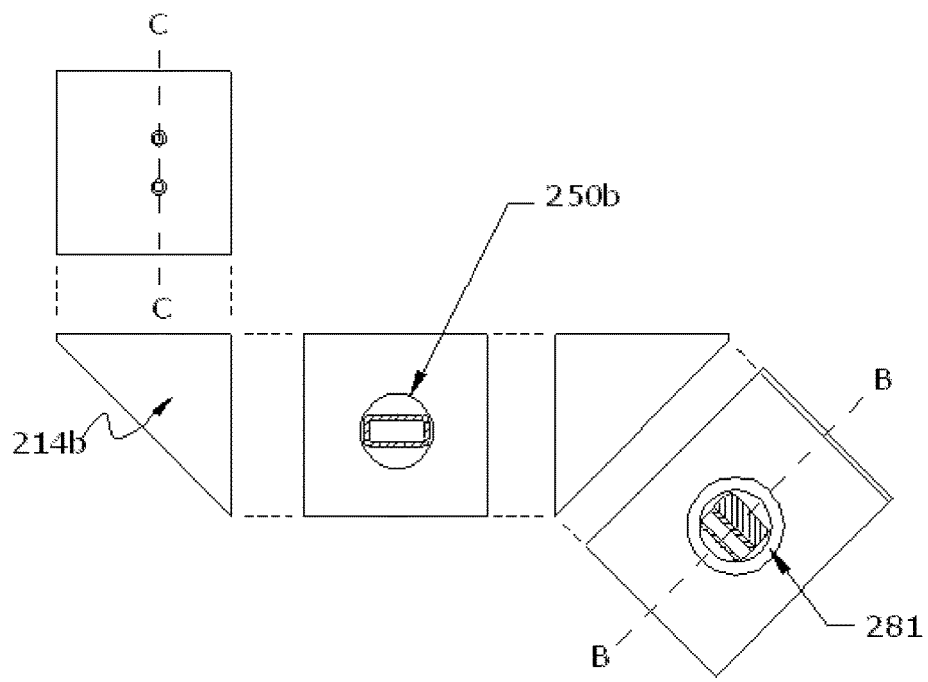
FIG. 6A
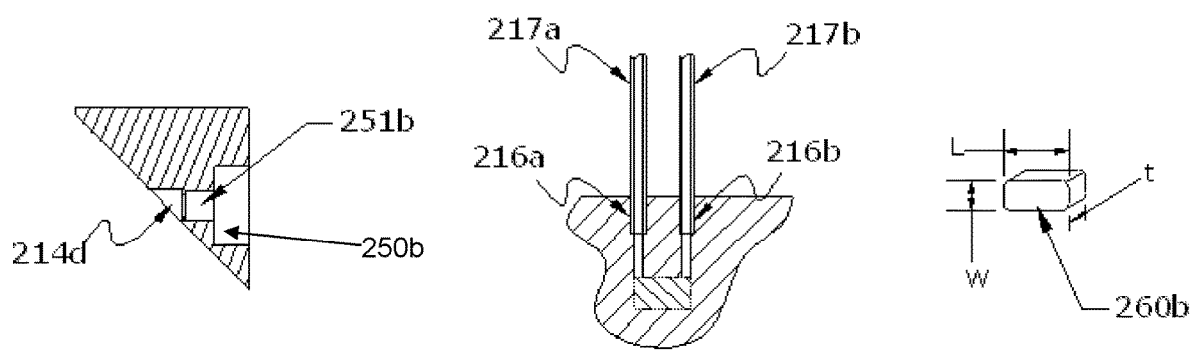
FIG. 6B    FIG. 6C    FIG. 6D

SYSTEMS AND METHODS FOR REFRACTIVE INDEX DETECTION

RELATED APPLICATIONS

This application is a divisional application of U.S. patent application with Ser. No. 14/775,752 entitled "Systems and Methods for Refractive Index Detection," filed Sep. 14, 2015, which is a nationalization of PCT Application with International Application Number PCT/US2014/023142 entitled "Systems and Methods for Refractive Index Detection," filed Mar. 11, 2014, both of which claimed priority to and benefit of U.S. Provisional Patent Application No. 61/819,811 entitled "Systems, Methods and Devices for Refractive Index Detection," filed May 6, 2013 and U.S. Provisional Patent Application No. 61/789,098 entitled "Systems, Methods and Devices for Refractive Index Detection," filed Mar. 15, 2013. The contents and teachings of each of these applications are hereby expressly incorporated herein by reference in their entirety.

FIELD OF THE INVENTION

The present invention generally relates to refractive index detection, and in particular, systems, methods and devices for measuring refractive index differences with low fluidic dispersion.

BACKGROUND

The measurement of the refractive index or RI of a fluid such as a gas or liquid has widespread applications across many industries. RI is a property of a fluid which characterizes its response to an externally applied electromagnetic radiation field. Different substances respond to the same field to an extent dependent upon the specific material and it is this varying response which forms the basis for both quantifying a given material and distinguishing it from another. Generally though, the qualitative aspects of an RI measurement are less sought after than its appeal as a quantitative tool since many substances, such as sugars, are less amenable to other forms of analysis such as UV absorbance detection (i.e., they lack of strong UV chromophore) or fluorescence. RI is sometimes referred to as a universal detector since so many substances will exhibit an RI response. In particular, an RI detector preceded by a separation means, such as a liquid chromatograph, will yield responses for virtually all substances. In this measurement mode, a sample containing one or more analytes is injected onto a chromatographic column. Subsequent continuous flow of a clean mobile phase through the column leads to a separation in time of the individual analytes. These analytes elute or exit from the column as individual peaks having a characteristic volume and retention time reflective of the analyte and column packing material. The peak is transported from the column to the RI detector, which produces a response proportional to analyte concentration. Since each peak contains the original quantity of analyte dissolved within the mobile phase, the more compact or narrow the volume of the peak, the larger the RI response will be for the same injected mass. Compact peaks are characteristic of minimal dispersion during transit of the analyte peak from the column to the detector. The process whereby the peak exiting the column is broadened during transport to a downstream detector is generally referred to as post-column dispersion.

Proper management of post-column dispersion can allow the volumetric scale of the separation to be decreased, which can yield meaningful gains in signal enhancement for many detection methods, including concentration sensitive analyzers such as differential RI detectors. Peak volumes decrease in proportion to the cross-sectional area of the column. Thus, for two columns whose diameters differ by a factor of two, the peak volume for the smaller ID column is expected to be four times smaller and therefore for the same mass injected, the concentration should be four times larger. There are other important advantages in going to smaller scale separations. For example, reduced solvent consumption is an advantage for applications that employ expensive mobile phases, which are common in RI detection.

Large scale chromatographic systems can be categorized as those employing separation columns with internal diameters (IDs) greater than about 4 mm, small scale columns with IDs in the range of about 1-4 mm, and capillary scale systems with IDs less than about 1 mm. Chromatographic theory can predict the peak volume of a retained analyte and it is this volume which serves as a guide in judging the effects of post-column dispersion. For the preceding range of columns, packed with conventional particles, typical peak volumes for early eluting analytes ($k'=2$) are shown in Table 1.

TABLE 1

| Column ID, mm | Column Length, mm | Particle Size, microns | Peak Volume (4.4%), µL | Optimum Flow Rate, ml/min | Time, min, for 1 Column Volume |
|---|---|---|---|---|---|
| 4.6 | 150 | 3.5 | 180 | 0.56 | 2.94 |
| 3.0 | 100 | 1.7 | 44 | 0.49 | 0.95 |
| 0.5 | 100 | 1.7 | 1.2 | 0.014 | 0.95 |

In practice, system parameters such as flow rate, operating pressure, etc. will be affected by the column choice. Relative to a large scale separation, the same application can be carried out with a small scale system in a manner that yields benefits both in time and reduced solvent consumption. As peak volumes for small scale systems are smaller, tighter constraints are placed on controlling sources of post-column dispersion. Accordingly, there is a need for low dispersion differential refractometers intended for separations conducted on small scale systems.

A broad range of RI detectors coupled to a separation system have been described in the art. For example U.S. Pat. No. 3,674,373 describes a heat exchanger for a differential refractometer. As is well-known, the temperature coefficient of the refractive index of most fluids is such that poor thermal control can lead to unwanted detector responses which are many times larger than the signal of interest. The '373 patent discloses tubing with inner diameters in the range of 0.02" to 0.04" with lengths of up to 12". These tubing dimensions correspond to post-column volumes from 60 µL to 160 µL, which are unsuitable for small scale separations. U.S. Pat. No. 3,999,856 describes a diffractometric refractometer which measures a phase shift between a probe beam which has passed through a reference and sample flow cell chamber. Flow cell volumes as small as 2 µL are discussed, but such small cells generally have short mechanical pathlengths, which can lead to limitations when attempting to measure both very small and large refractive index differences. The '856 patent does not disclose detector volumes between the column and flow cell or thermal management of the sample or reference streams.

Many techniques have been described in the art for measuring refractive index difference based upon a phase shift of light which has traveled through reference and sample fluid cells and which is then recombined in a plane distant from the cell. These techniques, broadly classified as interferometric methods, can be carried out with low volume flow cells but still require low pre-cell fluidic volumes and good thermal management to enable accurate RI differences.

U.S. Pat. No. 4,952,055 describes a beam displacement technique carried out in a capillary-based flow cell. While low volume cells are feasible, a setup method is described that requires alignment of the probe beam to the flow cell at an angle based upon the refractive index of the cell material (glass) and the sample fluid. Thus, measuring RI differences over a large range of absolute RI (e.g., from 1.30 to 1.60 RI units) as would be necessary in a general purpose RI detector, would necessitate optical realignments which could negatively impact instrument performance. Other techniques, such as those employing evanescent sensing (e.g., as disclosed in U.S. Pat. No. 5,311,274) may also be realized in low volume configurations but have limited range due to the dependence upon the refractive index of the light-carrying material.

U.S. Pat. Nos. 5,606,412 and 5,900,152 describe apparatus for modifying flow profiles within a non-circular flow cell by generally directing this flow towards the interior side surfaces of the cells. The apparatus of these patents refer to flow cells having volumes in the range of about 7 to 50 μL which are more suitable for large scale chromatography.

Accordingly, there remains a need for robust, wide-ranging, and sensitive differential RI detectors exhibiting low dispersion.

SUMMARY

A robust, wide-ranging, and sensitive differential RI detector exhibiting low dispersion can be achieved by reducing the volume of the detector system, e.g., by minimizing the length of fluidic paths within the detector, subject to thermal control of the incoming fluid stream and spatially-tailored injection of the fluid into the sample chamber. Flow cells according to embodiments of the present invention can also be capable of operation at high pressures.

In an embodiment, a differential refractive index detector may include a flow cell body. The flow cell body may include a flow cell assembly. The flow cell assembly may include discrete optically transmissive elements. The flow cell assembly may further include a first assembly including a sample chamber and a second assembly including a reference chamber. The first assembly and second assembly may be joined.

One or more of the following features may be included. A cross-sectional profile of at least one of the sample chamber and the reference chamber taken perpendicular to a flow axis of the flow cell body may include at least one curved portion. At least one of the sample chamber and the reference chamber may be formed by at least one of a circular bore and an elliptical bore provided through a long axis of the flow cell body. The differential refractive index detector may also include a first window fluidically separating the sample chamber from the reference chamber. The differential refractive index detector may further include a second window preventing fluidic leakage from the sample chamber outside of the flow cell body. The differential refractive index detector may additionally include a third window preventing fluidic leakage from the reference chamber outside of the flow cell body.

In one or more implementations, the first assembly including the sample chamber and the second assembly including the reference chamber may be joined by at least one of: a fastener; a screw; and a clamp. A main joint may join the first assembly including the sample chamber and the second assembly including the reference chamber. The main joint may include an O-ring seal and a corresponding groove. The second window may be sealed to the sample chamber by at least one of an edge seal and a gasket interposed between the second window and a receiving surface. The third window may be sealed to the reference chamber by at least one of an edge seal and a gasket interposed between the third window and a receiving surface.

In one or more implementations, the differential refractive index detector may include at least one counterbore accommodating at least one of a clamp and a retaining mechanism to maintain at least one of a second window and a third window in a recess of at least one of the first assembly and the second assembly. Sharp corners may have been substantially eliminated from at least one of the sample chamber and the reference chamber. A volume of at least one of the sample chamber and the reference chamber may be at least one of: less than or equal to about 5 uL; in a range of about 2 uL to 5 uL; and less than or equal to about 2 uL. The second window may be received in a cavity of the first assembly including the sample chamber. The third window may be received in a cavity of the second assembly including the reference chamber.

In an embodiment, a differential refractive index detector may include a flow cell body. The flow cell body may include a flow cell assembly. The flow cell assembly may include discrete optically transmissive elements including a sample chamber and a reference chamber. A cross-sectional profile of at least one of the sample chamber and the reference chamber taken perpendicular to a flow axis of the flow cell body may include at least one curved portion.

One or more of the following features may be included. At least one of the sample chamber and the reference chamber may be formed by at least one of a circular bore and an elliptical bore provided through a long axis of the flow cell body. Sharp corners may have been substantially eliminated from at least one of the sample chamber and the reference chamber. The flow cell assembly may include a first assembly including the sample chamber and a second assembly including the reference chamber. The first assembly and the second assembly may be joined. The first assembly including the sample chamber and the second assembly including the reference chamber may be joined by at least one of: a fastener; a screw; and a clamp.

In an embodiment, a differential refractive index detector may include a flow cell body. The flow cell body may include a flow cell assembly. The flow cell assembly may include discrete optically transmissive elements which may include a sample chamber, a reference chamber, a first window fluidically separating the sample chamber from the reference chamber, a second window preventing fluidic leakage from the sample chamber outside of the flow cell body, and a third window preventing fluidic leakage from the reference chamber outside of the flow cell body. The flow cell assembly may also include a first assembly including the sample chamber and second window. The flow cell assembly may further include a second assembly including the reference chamber and the third window. The first assembly and the second assembly may be joined by a fastener. A cross-sectional profile of at least one of the sample chamber and the reference chamber taken perpendicular to a flow axis of the flow cell body may include at least one curved portion.

BRIEF DESCRIPTION OF THE DRAWINGS

The invention will be more fully understood from the following detailed description taken in conjunction with the accompanying drawings, in which:

FIG. 3A illustrates a refractometer flow cell assembly according to one embodiment of the present invention;

FIG. 3C is a sectional view of the flow cell of FIG. 3A taken along line c-c;

FIG. 6A illustrates the reference chamber of the flow cell assembly of FIG. 5A according to an embodiment of the present invention;

FIG. 6B is a sectional view of the reference chamber of FIG. 6A taken along line B-B;

FIG. 6C is a sectional view of the reference chamber of FIG. 6A taken along line C-C;

FIG. 6D illustrates a window of the reference chamber of FIG. 6A according to an embodiment of the present invention;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Figure 1:
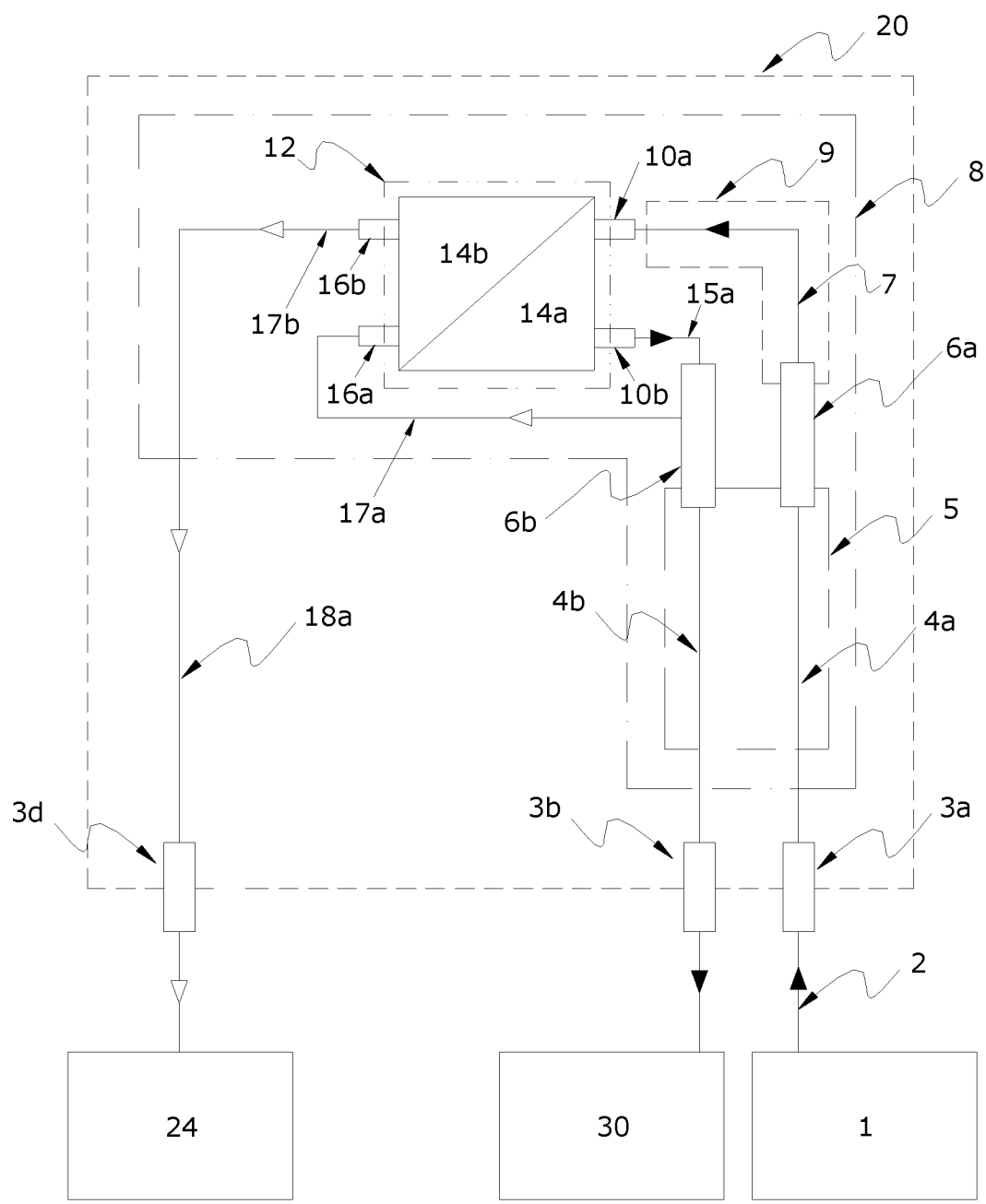
FIG. 1 illustrates a schematic layout of a differential RI detector coupled to a separation system, according to an embodiment of the present invention.

FIG. 1 illustrates an exemplary separation system including a differential RI detector. The separation system includes a separation unit 1. The separation unit 1 can include various modules. For example, the separation unit 1 can include modules such as a sample organizer, a pump for delivering fluid(s), a sample injector, a separation column, a column manager, and a central control unit such as a computer on which software is installed for directing the overall separation. The separation system can also include an RI detector 20. The RI detector 20 can include various fluidic and thermal conditioning or control means, discussed in more detail below. The RI detector 20 can also include an optical sensing system configured to quantify the difference in refractive indices of fluids contained within separation chambers of a flow cell 12. As discussed in more detail below, the detector 20 has two primary modes of operation, which are referred to herein as a purge mode and a normal mode.

When operating in purge mode, the separation unit 1 delivers a reference fluid along a path 2 to a detector inlet 3a. In purge mode, a valve in outflow unit 30 is closed, which forces flow along the path between the detector inlet 3a and the flow cell inlet port 10a, through the sample chamber 14a of the flow cell 12, then into the reference chamber 14b of flow cell 12, then exiting the reference chamber along conduits 17b and 18a, and finally passing into outflow unit 24 from which the fluid may be diverted either to waste or a recycling container. After a completed purge operation in purge mode, the fluid composition within the chambers 14a, 14b of the flow cell 12 is the same. During this period, i.e., when the fluid composition of the chambers 14a, 14b of the flow cell are identical, the optical sensing system can then be used to collect a calibration signal. The calibration data can include a detector output signal and can be stored in a digital memory location.

When operating in normal mode, a test sample is injected onto the column within test unit 1 and a separation of this sample into one or more analytes commences as the reference fluid is flowed through the column at constant flow rate. The eluant from the column is transported to the RI detector 20 via fluid conduit 2. In exemplary embodiments, the fluid conduit 2 can be sized to minimize dispersion between the outlet of the column and the connection at the detector 3a, which can also be of a low dispersion type. In some embodiments, the temperature of the interior of the detector 20 can be controlled by a master control unit, not shown. In normal mode, a valve in outflow unit 30 is opened resulting in an active fluid path along conduit 4b and into unit outflow unit 30 through connector 3b. The outflow unit 30 may be configured to divert the flow either to waste or a recycling container. In normal mode, there is no flow along conduit 17a into the reference chamber 14b or exit from the reference chamber 14b along conduit 18a. However, a hydraulic connection still exists between these flow paths, which can mitigate unwanted detector responses that can result from pressure variations associated with the separation unit 1, e.g., by maintaining the two chambers of the flow cell 12 at the same pressure. During operation in the normal mode, the detector output signal is collected. The detector output signal is processed to remove the calibration signal recorded in purge mode and scaled by known factors to yield a detector output value representing the refractive index difference between the analyte contained within the sample chamber 14a and the reference fluid within chamber 14b of the flow cell 12. Analyte concentration may be related to the refractive index difference through a separate calibration step. The record of the detector output signal versus time forms a chromatogram.

As discussed above, the temperature of the interior of the detector 20 can be controlled, e.g., by a master temperature control unit. In some embodiments, the incoming test fluid can be thermally conditioned. For example, a first internal thermal conditioning module 5 can adjust the temperature of the incoming fluid within conduit 4a to the temperature of the outgoing fluid flow through conduit 4b. In exemplary embodiments, thermal conditioning module 5 can be a countercurrent heat exchanger. The fluidic volume of conduit 4a within the first internal conditioning module 5 can be reduced to a sufficiently small value while providing high efficiency so that its contribution to overall peak dispersion can be minimized for a broad range of flow rates and fluid viscosities. In some embodiments, the detector 20 can include a second thermal conditioning unit 9. The second thermal conditioning unit 9 can be a heat sink whose absolute temperature is tightly regulated by a master heater control unit. Flow cell 12 and the fluidic inlet and outlet ports 10a, 10b, 16a, 16b can be attached to the second thermal conditioning unit 9 through standard mechanical means, such as by screws, press fits, welding, brazing, etc. Further thermal shielding can be provided by an enclosure, which provides further isolation from other components such as circuit cards, etc. within the interior of 20.

One skilled in the art will appreciate that an analyte's post-column peak shape is typically determined by the dispersive properties of the fluid path from the separation unit through the detector, e.g., from 1 to 15a in FIG. 1. Low dispersion tubing and connectors, e.g., conduit 2 and connector 3a in FIG. 1, are well known and readily available. Low dispersion tubing can be characterized as having small lumen diameters and smooth internal surfaces. Exemplary low dispersion connectors include commercially available zero dead volume unions.

The dispersive properties of the fluid path from the separation unit through the detector are also affected by the length and volume of the various portions of that fluid path. For example, on the fluid path from 3a to 10b in FIG. 1, for a volume of conduit 4a less than about 20 μL, the heat exchanger efficiency of 5 can be maintained at very high levels, e.g., in excess of 80%, for flow rates as large as 2 ml/min. The efficiency of heat exchanger 5 can also be maintained for flow rates as large as 2 mL/min for volumes of conduit 4a less than about 10 μL and as small as about 2 μL. The volume of conduit 7 within thermal conditioning unit 9 can also be reduced to less than about 10 μL, and in some embodiments, less than about 5 μL and still provide the level of thermal stabilization needed for low noise. For example a differential RI detector employing the low volume thermal conditioning units described herein can achieve noise levels comparable to an RI detector with a thermal conditioning volume more than 10 times larger. In conjunction with the reduced tubing volumes, the flow pattern into 14a can also be spatially tailored, e.g., by internal tapering of the connection 10a, as discussed in more detail below.

Figure 2A:
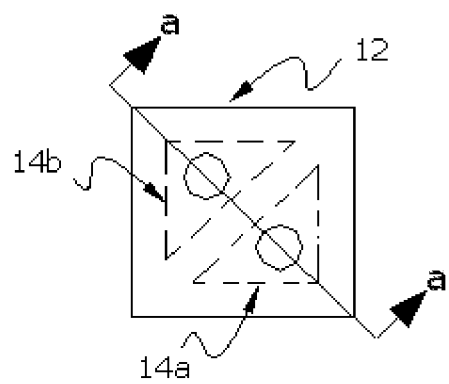
FIG. 2A illustrates a refractometer flow cell with prismatic sample and reference chambers.
Figure 2B:
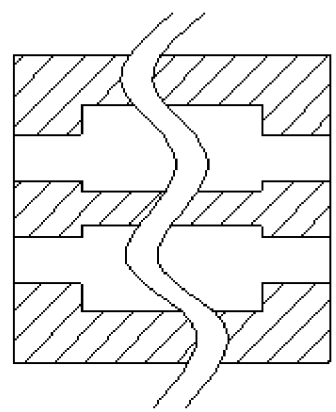
FIG. 2B is a sectional view of the flow cell of FIG. 2A taken along line a-a.

Flow through a conduit is influenced by several factors including the shape of the conduit. In exemplary flow cells, flow can be introduced into the cell axially. For example, FIGS. 2A and 2B illustrate a refractometer flow cell 12 that includes axial ports. However, axial ports can be insufficient to minimize all the effects of disturbances to flow profiles in fluid chambers having rectangular or triangular-shaped cross sections, e.g., as shown in FIGS. 2A and 2B.

Figure 3B:
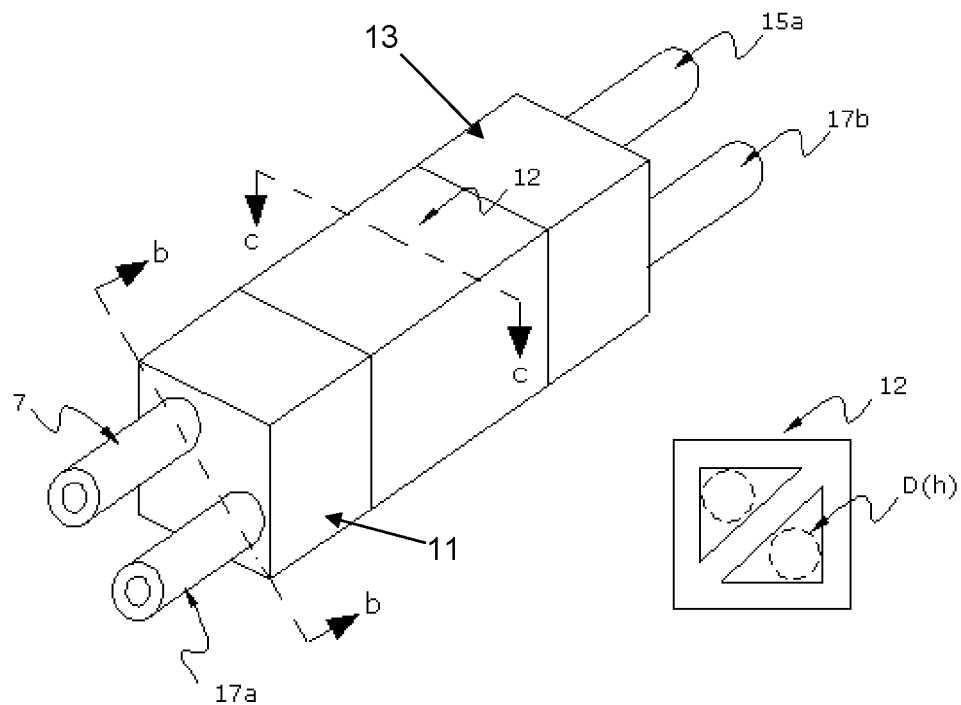
FIG. 3B is a sectional view of the flow cell of FIG. 3A taken along line b-b.

Fluid ports having a tapered profile, coupled in some embodiments with appropriately small conduit volumes leading into the RI cell, can decrease dispersion to such a degree that differential RI detection can be carried out on small scale separations. FIG. 3A illustrates a flow cell according to one embodiment of the present invention. The sectional view of FIG. 3B depicts various connection details.

In the exemplary flow call of FIGS. 3A and 3B, a sample flows into the RI cell 12 through low volume, small bore conduit 7 before entering the sample chamber 14a. When the fluid from conduit 7 enters the chamber 14a there will be energy loss due to sudden expansion in the cross-sectional area of 14a. Such changes in cross-section can lead to unwanted effects such as flow reversal (eddies) arising from very low fluid velocities along the interior corners of the chamber. To mitigate the energy loss due to this sudden change in the hydraulic diameter between conduit 7 and prism compartment 14a, a taper of suitable angle is provided. The purpose of the taper is to allow for a gradual change in velocity and minimize the energy loss as the fluid enters the prism compartment, 14a. The taper angle can be selected to optimize transition in velocity, i.e., to promote a smooth and gradual velocity change. For example, the total taper angle can be in the range of about 8° to about 20°. In some embodiments, the taper angle can be in the range of about 8° to about 10° or about 10° to about 20°. For example, the taper angle can be about 8°, about 10°, or about 20°. In an exemplary embodiment, the hydraulic diameter of the outlet of the tapered section can be selected to match the largest diameter of an inscribed circle defined by the boundaries of the prism compartment, 14a, illustrated by D(h) in FIG. 3C.

In exemplary embodiments, the transition from conduit 7 into the sample chamber 14a can be provided by a connector 11 having a connector bore 10a, as shown in FIG. 3B. As noted above, tapering the connector bore 10a can reduce the fluid velocity and the resulting dispersion. Likewise, the transition from conduit 17a into the reference chamber 14b can be provided by a connector bore 16a in connector 11, which can also be tapered as discussed above. Similarly, the transition from the sample chamber 14a and the reference chamber 14b can be provided by a connector 13 having connector bores 10b and 16b, which can also be tapered. In other embodiments, the connector bores 10a, 10b, 16a, 16b may not be tapered. For example, under normal circumstances, there would be no need to employ tapered connectors, 16a, 16b for the reference chamber 14b because the fluid contained therein is substantially static. For example, connector bores 16a and 16b can have a straight bore that matches the inner diameter of fluid conduits 17a and 17b.

The conduits 7, 17a, 15a, and 17b can have an inner profile of elliptical or circular shape. In exemplary embodiments, the internal diameter of the fluid conduits, e.g., fluid conduits 7, 15a, 17a, and/or 17b can be less than or equal to about 0.011". For example, the internal diameter of these fluid conduits can be less than or equal to about 0.005", or in the range of about 0.005" to about 0.011". In exemplary embodiments, the flow cell chamber volume, i.e., the volume of the sample chamber or the reference chamber, can be less than or equal to about 5 μL. For example, the flow cell chamber volume can be in the range of about 2 μL to about 5 μL, or less than or equal to about 2 μL. In one embodiment, the flow cell sample chamber and reference chamber cross sections can be right triangles having equal side lengths of about 0.80 mm and the flow cell chambers can have a length of about 4.0 mm, resulting in flow cell chambers with an internal volume of about 1.3 μL. For such a flow cell, the largest diameter of an inscribed circle defined by the boundaries of the sample chamber 14a or the reference chamber 14b, illustrated by D(h) in FIG. 3C would be about 0.468 mm (0.0184").

Standard fastening means such as brazing or welding may be used to attach metal conduits to the taper sections, such as conduit 7 to taper section 10a. The cell 12 can be sealed to each connector assembly using compliant gaskets made from materials such as Teflon or PEEK. The gaskets may be in the form of flat sheets with suitable apertures or O-Rings to permit the unrestricted flow of fluids into and out of the respective chamber.

Figure 4:
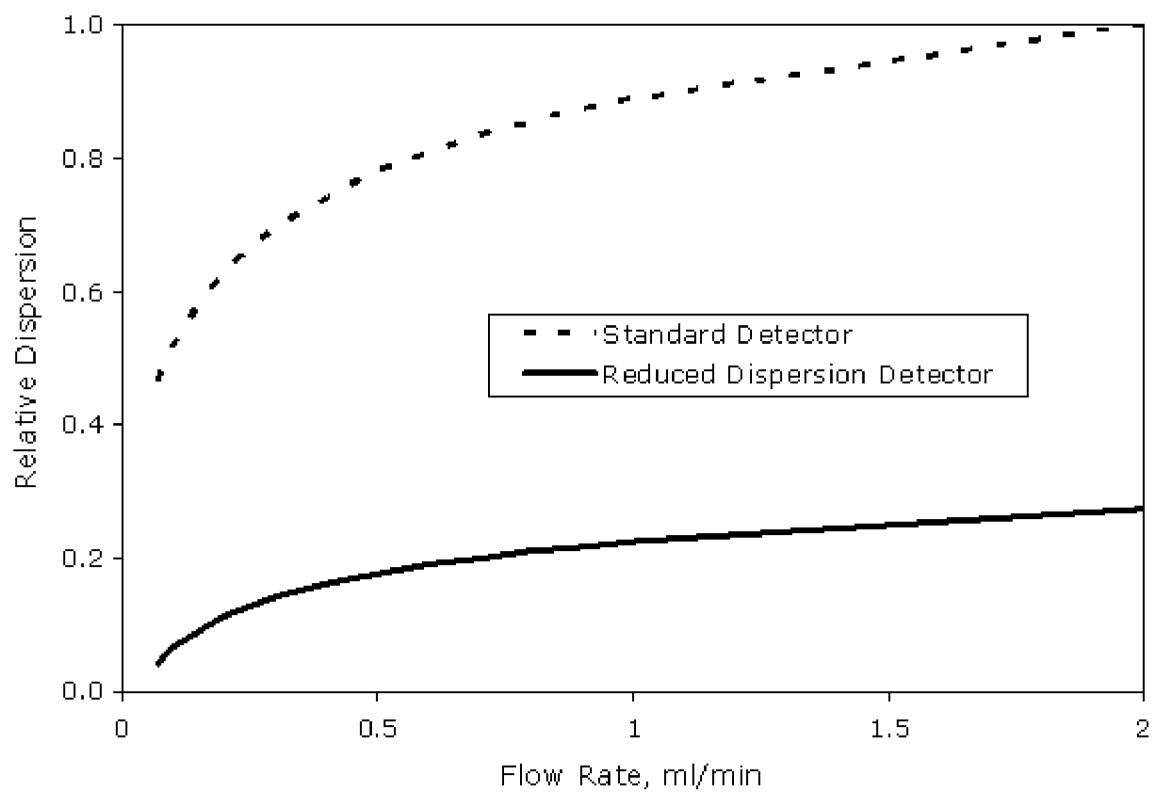
FIG. 4 is an exemplary plot of dispersion and flow rate for two differential RI detectors.

FIG. 4 is a plot of dispersion for a range of flow rates for a standard differential RI detector intended for large scale separation systems and a reduced dispersion detector according to embodiments of the present invention. As shown in FIG. 4, the dispersion of the standard detector is at least 4 times larger than reduced dispersion detectors according to the present invention for the region of optimum flow rate of the large and small scale separation columns from Table 1. The nearly 3 times speed benefit of going to a small column shown in Table 1 can also be achieved without any decrease in chromatographic efficiency using reduced dispersion detectors according to the present invention. As many chromatographic applications are not sample limited, the reduced dispersion may be further exploited by loading where practical the same mass on column as for the large system, which is expected to lead to an increase in peak heights of nearly 4-fold. Such an increase provides numerous advantages, such as lower limits of detection.

Figure 3B:
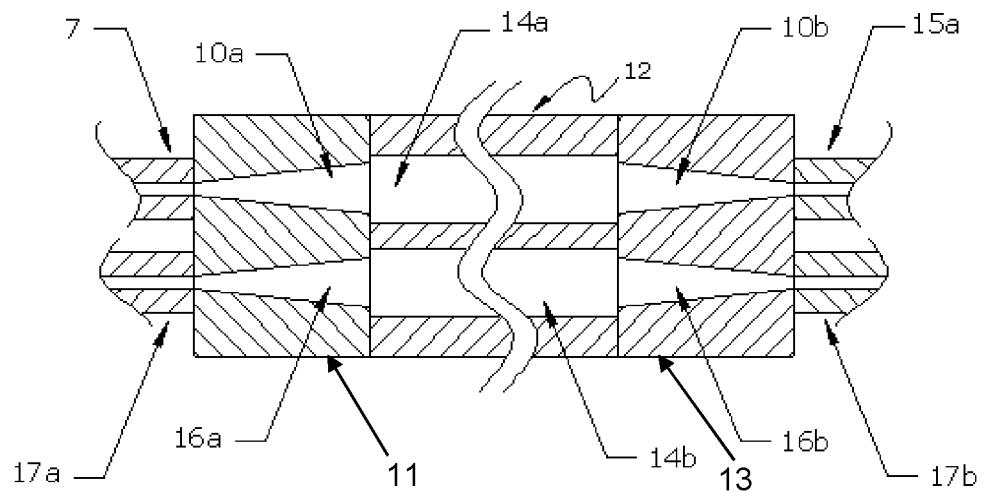

The differential refractometer flow cell 12 of FIG. 3 can be conventionally manufactured as an all-glass assembly, e.g., optically clear fused quartz. However, an all-glass assembly can limit the operational pressures of the cell to pressures less than about 100 psi. Beyond this pressure limit, certain elements of the flow cell are prone to fracture. In exemplary embodiments of the present invention, flow cells can be fabricated from discrete optically transmissive elements incorporated into a mechanical framework the overall pressure resistance of which is much higher. FIGS. 5A to 7B depict the elements of such an assembly. The flow cell assembly of FIGS. 5A to 7B can provide low dispersion and withstand high pressures, e.g., greater than about 100 psi. The flow cell assembly of FIGS. 5A to 7B, discussed in more detail below, can function equally well across both large and small scale separations and can be particularly advantageous for small scale separations.

Figure 5A:
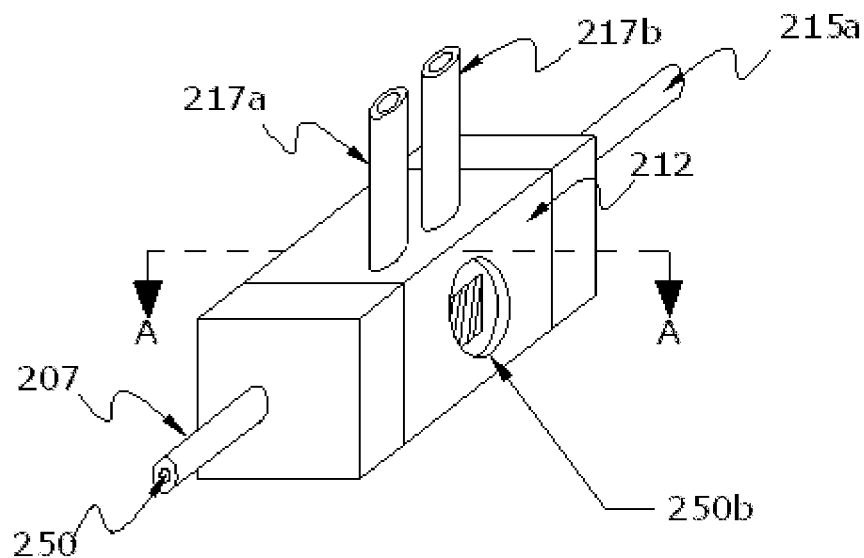
FIG. 5A illustrates a refractometer flow cell assembly constructed to withstand high operating pressures according to an embodiment of the present invention.

The flow cell assembly of FIG. 5A is similar to that illustrated in FIG. 3A, with differences arising from the configuration of the flow cell 212. Sample flow enters the differential RI cell through conduit 207 whose lumen diameter 250 is selected according to desired dispersion properties, as discussed above. The dimensional features of the exit conduit 215a from this chamber are also chosen accordingly. As discussed above, the input conduit 217a and exit conduit 217b from the reference chamber are generally non-critical with respect to analyte peak dispersion. The fluid conduits 217a and 217b are shown in the exemplary embodiment illustrated in FIG. 5A entering perpendicular to the sample conduits 207 and 215a. In other embodiments, the fluid conduits 217a and 217b can enter the flow cell parallel to the sample conduits 207 and 215a.

Figure 5B:
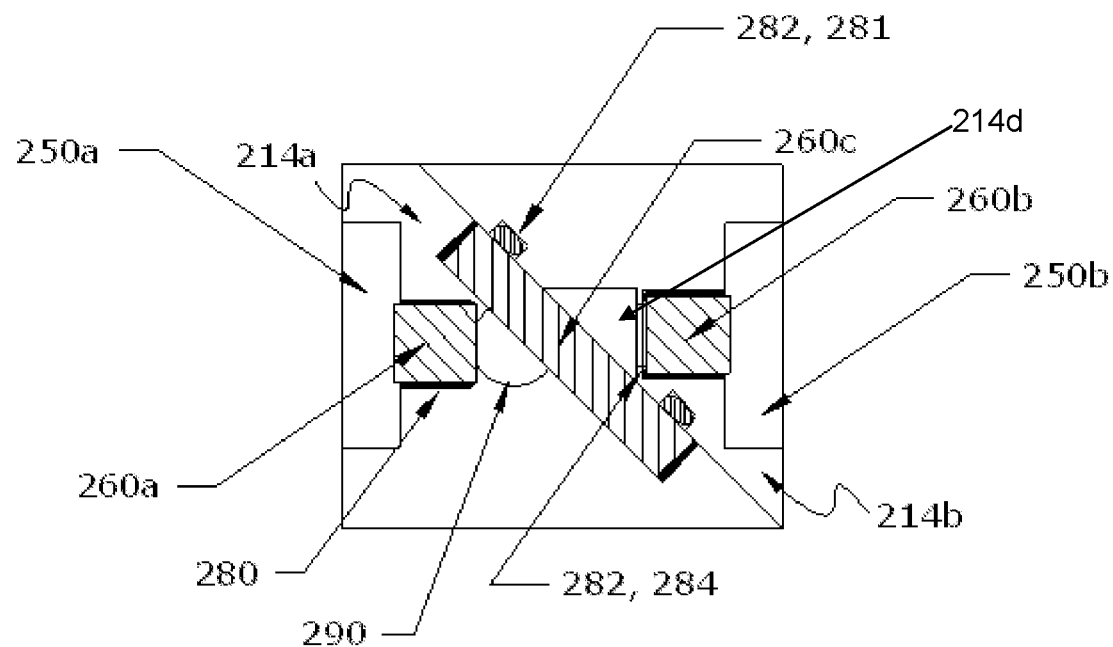
FIG. 5B is a sectional view of the flow cell of FIG. 5A taken along line A-A.

As shown in FIG. 5B, the flow cell prism assembly 212 includes two parts, defined by discrete assemblies 214a and 214b. Assembly 214a includes sample chamber 290. Assembly 214b includes reference chamber 214d. These assemblies may be joined in well-known manners such as by screws, clamps or other fasteners, not shown. The main joint between 214a and 214b includes an O-ring seal formed by O-ring 282 and a corresponding groove 281 in 214b. Optically transparent windows 260a, 260b, 260c provide for passage of the optical beam which interrogates the refractive index difference between the sample and reference fluids. The windows 260a, 260b, 260c also confine the respective fluids within each chamber by only permitting flow through the corresponding inlet and outlet conduits. Optical window 260c prevents the two fluids from directly exchanging, while windows 260a and 260b prevent leakage from within each chamber outside the cell 212. Windows 260a and 260b can be sealed to their respective machined (or molded) assemblies by edge seals 280 or by sheet-like gaskets 282 interposed between the respective window and its receiving surface 284.

In some embodiments, the flow cell 212 can include counterbore features 250a and 250b. The dimensions of the counterbore features 250a and 250b are chosen in accordance with the size of optical elements coupled to the flow cell. For example, the dimensions of the counterbore features 250a and 250b can be used to register masks which define a precise size of the optical beam passing through 212. In other examples, the counterbore features 250a and 250b can accommodate clamps or other retaining mechanisms to maintain the windows 260a and 260b in their respective recesses.

In exemplary embodiments, the sample chamber 290 can be formed by a circular or elliptical bore provided through the long axis of the assembly 214a. After machining to accommodate windows 260a and 260c, the circular bore 290 can yield a chamber profile in which sharp corners have been substantially eliminated. For example, a cross-sectional profile of sample chamber 290 taken perpendicular to the flow axis of the flow cell body can include at least one curved portion. The resulting chamber profile provides numerous advantages, such as more uniform flow profiles, which can lead to improved dispersion properties. In some cases, a portion of the bore 290 may not be interrogated by the optical beam. However, the improved flow profile can yield an overall reduction in peak dispersion. In some embodiments, the reference chamber dimensions can be increased relative to the dimensions of the sample chamber. In some embodiments, the cross-sectional profile of the reference chamber within the reference assembly 214b can also be elliptical or circular. In exemplary embodiments, the flow cell chamber volume, i.e., the volume of the sample chamber or the reference chamber, can be less than or equal to about 5 µL. For example, the flow cell chamber volume can be in the range of about 2 µL to about 5 µL, or less than or equal to about 2 µL.

Figure 7A:
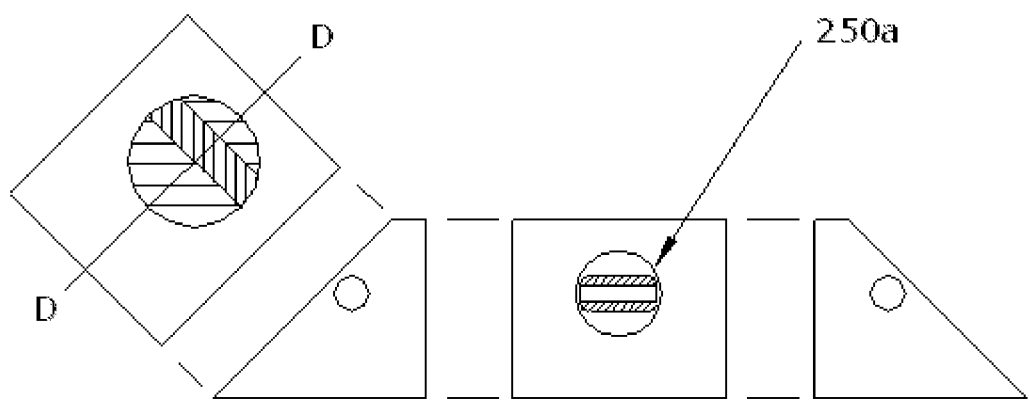
FIG. 7A illustrates the sample chamber of the flow cell assembly of FIG. 5A according to an embodiment of the present invention.
Figure 7B:
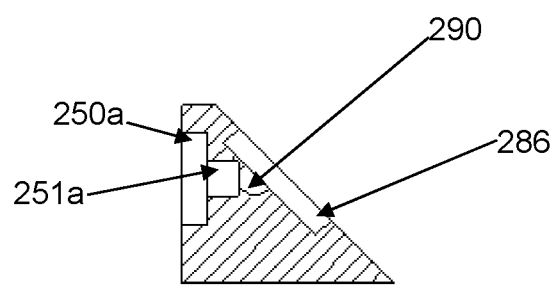
FIG. 7B is a sectional view of the sample chamber of FIG. 7A taken along line D-D.

FIGS. 6A to 6D illustrate reference assembly 214b in greater detail showing features associated with the various faces. Fluid conduits 217a and 217b can be attached to 214b via welding or other techniques. For example, the distal ends 216a and 216b of the fluid conduits 217a and 217b can be inserted into corresponding recesses in the outer surface of assembly 214b. The window 260b can be received in a cavity 251b, shown in FIG. 6B. The length L, width W and thickness t of window 260b illustrated in FIG. 6D can be chosen according to well-known engineering formulas based upon the desired pressure rating for the cell, window material, and sealing stresses. FIGS. 7A-7B illustrate the sample assembly 214a in greater detail showing features associated with the various faces. For clarity, the conduit 207 is omitted from FIG. 7A. FIG. 7B illustrates a sectional view taken along line D-D in FIG. 7A. The window 260a can be received in a cavity 251a, shown in FIG. 7B. The window 260c can be received in cavity 286, shown in FIG. 7B.

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A differential refractive index detector, comprising:
a flow cell body having a proximal end, a distal end and a flow axis extending between the proximal end and the distal end, the flow cell body comprising a flow cell assembly having discrete optically transmissive elements and comprising:
a first assembly including a sample chamber having a cross-sectional profile that includes at least a curved portion and is configured to permit a sample flow in a direction parallel to the flow axis; and
a second assembly including a reference chamber to receive a reference liquid, the reference chamber having a cross-sectional profile that is different from the cross-sectional profile of the sample chamber,
wherein the first assembly and the second assembly are joined, and the discrete optically transmissive elements provide for passage of an optical beam which interrogates a refractive index of the sample flow and a reference liquid in a direction perpendicular to the flow axis.

2. The differential refractive index detector of claim 1, wherein at least one of the sample chamber and the reference chamber is formed by at least one of a circular bore and an elliptical bore provided through a long axis of the flow cell body.

3. The differential refractive index detector of claim 1, further comprising:
a first window fluidically separating the sample chamber from the reference chamber.

4. The differential refractive index detector of claim 3, further comprising:
a second window preventing fluidic leakage from the sample chamber outside of the flow cell body.

5. The differential refractive index detector of claim 4, further comprising:
a third window preventing fluidic leakage from the reference chamber outside of the flow cell body.

6. The differential refractive index detector of claim 5, wherein the third window is sealed to the reference chamber by at least one of an edge seal and a gasket interposed between the third window and a receiving surface.

7. The differential refractive index detector of claim 4, wherein the second window is sealed to the sample chamber by at least one of an edge seal and a gasket interposed between the second window and a receiving surface.

8. The differential refractive index detector of claim 5, wherein at least one of:
the second window is received in a cavity of the first assembly including the sample chamber; and
the third window is received in a cavity of the second assembly including the reference chamber.

9. The differential refractive index detector of claim 1, wherein the first assembly including the sample chamber and the second assembly including the reference chamber are joined by at least one of: a fastener; a screw; and a clamp.

10. The differential refractive index detector of claim 1, further comprising
a main joint joining the first assembly including the sample chamber and the second assembly including the reference chamber, the main joint including an O-ring seal and a corresponding groove.

11. The differential refractive index detector of claim 1, further comprising:
at least one counterbore accommodating at least one of a clamp and a retaining mechanism to maintain at least one of a first window and a second window in a recess of at least one of the first assembly and the second assembly.

12. The differential refractive index detector of claim 1, wherein sharp corners have been eliminated from at least one of the sample chamber and the reference chamber.

13. The differential refractive index detector of claim 1, wherein a volume of at least one of the sample chamber and the reference chamber is at least one of: less than or equal to about 5 uL; in a range of about 2 uL to 5 uL; and less than or equal to about 2 uL.

14. The differential refractive index detector of claim 1, wherein the at least a curved portion comprises at least a portion of a circle.

15. The differential refractive index detector of claim 1, wherein the at least a curved portion comprises at least a portion of an ellipse.

16. A differential refractive index detector, comprising:
a flow cell body having a proximal end, a distal end and a flow axis extending between the proximal and the distal end, the flow cell body comprising a flow cell assembly having discrete optically transmissive elements and including:
a sample chamber;
a first connector having a tapered connector bore and being in fluid communication with the sample chamber;
a reference chamber;
a second connector having a tapered connector bore and being in communication with the reference chamber;
a first window fluidically separating the sample chamber from the reference chamber;
a second window preventing fluidic leakage from the sample chamber outside of the flow cell body; and
a third window preventing fluidic leakage from the reference chamber outside of the flow cell body;
the flow cell assembly comprising:
a first assembly including the sample chamber and second window, the first assembly configured to permit a sample flow in a direction parallel to the flow axis;
a second assembly including the reference chamber and the third window, the second assembly configured to permit a reference flow in a direction parallel to the flow axis;
wherein the first assembly and the second assembly are joined by a fastener and a cross-sectional profile of the sample chamber taken perpendicular to the flow axis includes at least one curved portion, the reference chamber having a cross-sectional profile that is different from the cross-sectional profile of the sample chamber, and the discrete optically transmissive elements provide for passage of an optical beam which interrogates a refractive index of the sample flow and a reference liquid in a direction perpendicular to the flow axis.

* * * * *